Sept. 13, 1949.  J. T. FITZPATRICK  2,481,651
PRESSURE INDICATING DEVICE
Filed April 5, 1945.

INVENTOR.
John T. Fitzpatrick
BY Edward Thomas

Patented Sept. 13, 1949

2,481,651

UNITED STATES PATENT OFFICE 2,481,651

PRESSURE INDICATING DEVICE

John T. Fitzpatrick, Morristown, N. J.

Application April 5, 1945, Serial No. 586,773

3 Claims. (Cl. 73—395)

This invention relates to pressure indicating devices and is herein disclosed in some detail as embodied in a device especially adapted for showing the maximum explosion and pre-explosion pressures in Diesel engines.

The pressures in such engines run much higher than in ordinary steam engines and the engines often run very rapidly, with the result that it is almost impossible to get indicator card diagrams of pressures such as are often obtained for steam engines to enable any troubles to be diagnosed.

Diesel engines usually have several and often many cylinders and it is necessary to properly balance the load among the cylinders. To determine the location of any trouble arising from improper explosion mixtures, unbalanced pressures of compression and pressures of explosion, it is necessary to know these pressures, but most instruments available are complicated, some involving electrical contacts, storage batteries, electric terminals, and other parts.

One widely used instrument is commercially supplied with a coat or belt for the tester to wear so that he may carry the needed electric batteries with him and yet has his hands free. It is found that the electric terminals of that instrument often get oily or soiled, with the result that readings are difficult to get and are often unreliable.

Other instruments involve the use of springs and the user has to adjust the spring to obtain a balance and determine his reading from that that balance. Still other instruments are so constructed that they are readable only by re-setting some part and observing when a balance is reached.

Yet without reliable readings of the pre-explosion pressures and explosion pressures it is more by luck than by management that two cylinders of a Diesel engine can be made to work together, or can the location of other trouble be ascertained.

According to the present invention the foregoing and other difficulties are overcome, and an instrument is provided which is self-contained, rugged, reliable, easy to build and requires no electric battery.

In the form shown a nipple is adapted to be screwed on to the indicator cock of the engine cylinder, the valve in the engine tap is then opened for a few explosions or compressions, as the case may be and a gage on the body of the device shows the pressure. The device includes a simple check valve, which may be a ball adapted to hold the pressure so that the gage needle remains at the observed pressure and may be read conveniently.

The pressure of compressed gas may be retained unchanged for several seconds, or even minutes, or even for hours, because the device shown includes a small chamber in its bore for holding a fraction of a cubic inch of gas, and the walls of the chamber are of thick metal so that a balance of pressure and temperature is set up after two or three or possibly four or five strokes which successively compress the gas in the chamber.

The hot gas is shown as kept away from the gage by a plunger, which may be a cylindrical piece of metal in the bore, and, in the form shown, the plunger bears against the pressure gage through body of a fairly heavy oil with the result that the plunger need not fit tight but floats in a film of oil.

A bleeder valve enables the pressure in the chamber to be brought back to zero promptly by release of gas, so a second independent reading may be obtained instantly.

Other features and advantages will hereinafter appear.

In the accompanying drawing—

Figures 1, 2:
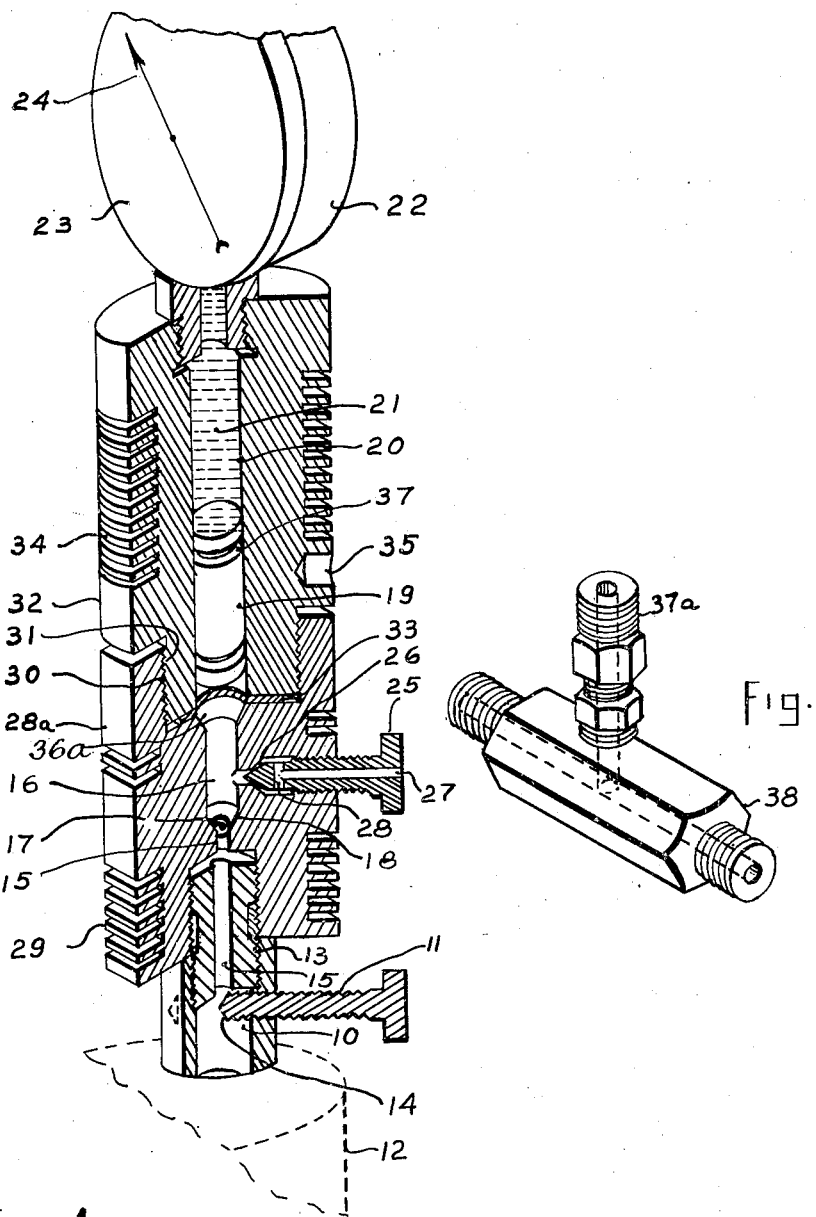
Figure 1 shows one form of the invention attached to a Diesel engine cylinder largely in section.
Figure 2 shows an alternative connection suitable for fuel line pressure measuring.

In the form shown the device includes a short pipe 10 threaded to fit the indicator cock 11 of a Diesel engine cylinder 12. The pipe 10 may include an extension adapter 13 to fit a special thread such as is used on some foreign engines.

The cock or tap 11 includes the usual valve 14, diagrammatically shown, so that when the valve 14 is opened the hot gases from the engine cylinder 12 flow through the pipe 10 into the bore 15 of the device which forms a somewhat enlarged chamber 16, found satisfactory if ¼ inch diameter and about an inch long.

In entering the chamber 16 the gases flow past a ball 17 forming check valve which is shown as normally resting on a tapered annular seat 18.

The upper end of the chamber 16 is shown as almost closed by a slidable plunger 19 fitting in a cylindrical bore 20 so as to trap a body 21 of oil above it. The oil 21 operates the gage 22 and lubricates the plunger 19. The plunger has been found satisfactory if 1⅜ inches by ⅜ inch, easily sliding in the honed channel.

When the hot gases enter through the opened valve 14 they fill the chamber 16 and push the plunger 19 a very slight distance. If a first explosion fails to leave the chamber 16 full, by reason of cooling or other factor, the next one or two or more explosions force in enough gases to give a stable balanced pressure, which is held by the ball valve 17.

The pressure then may be read upon the face 23 of the gage 22 by its pointer 24.

Then the pressure is released by turning the bleeder valve handle 25 which is shown as moving the valve face 26 away from its seat to allow the small amount of gas to escape from the chamber 16 through the hollow bore 27 of the handle 25, coming through the opening 28 which is shown as at one side and in effect closed when the handle bears against the face 26.

Above the plunger 19 the space is filled with a fairly thick oil such as S. A. E. No. 40. The gage 22 is shown screwed into the top of the device.

In the form shown the chamber 16 lies in a hexagonal section 28a provided with peripheral fins 29 to radiate heat, and with a coarsely threaded bore 30 so that the projecting threaded lower end 31 of the plunger chamber section 32 may be screwed into it. The end 31 may be counter-sunk at 33 to receive a soft copper washer to insure tightness of fit.

Further radiation may be provided at the section 32 by projecting fins 34. The section 32 may be round and include depressions 35 to be grasped by a spanner.

In the form shown the chamber 16 flares at 36a at its upper end to facilitate flow of gases.

The section 28a is hexagonal to facilitate grasping by a wrench, and the handle 25 is shown as a square bolt head for the same reason.

The facing ends of sections 32 and 28a are shown as smooth to fit closely and these peripheries as solid for a substantial fraction of an inch near those ends, while the fins 29 begin at the bottom where the device becomes hottest.

The plunger may include packing grooves 37, especially if intended for fuel oil measuring.

Figure 2 shows in dotted lines how the device may fit a fitting 37a cut into a fuel line 38.

Having thus described in some detail one embodiment of the invention what is claimed is:

1. The combination with a gage adapted to show pressure, a fitting connected to the gage and adapted to be connected to a source of pulsating pressure, said fitting having a bore extending therethrough and communicating with said gage, a valve seat in said bore near one end, a check valve resting on said seat, said bore providing a chamber portion adjacent said valve seat and being enlarged beyond the chamber portion, a plunger in said enlarged portion, a liquid filling the space between said plunger and the wall of the pressure responsive element of the gage and a bleed valve for the chamber portion.

2. The combination with a gage adapted to show pressures, of a heavily built unit on which it is mounted and including a first conduit to the gage, a second heavily built unit including a chamber leading to the conduit, means for transmitting pressure to the chamber, a check valve for holding said pressure in the chamber, a plunger in the first conduit, a body of oil filling the space between the plunger and wall of the pressure responsive element of the gage, whereby the plunger transmits pressure to the gage and protects the same from heat, and a bleed valve for the chamber.

3. The combination with a gage adapted to show pressures, of a heavily built unit on which it is mounted and including a first conduit to the gage, a second heavily built unit attached to said first unit having a chamber communicating with said first conduit, means for transmitting pressure to the chamber, including a second conduit leading to the chamber, a check valve for holding said pressure in the chamber, a plunger in the first conduit, a body of oil filling the space between the plunger and wall of the pressure responsive element of the gage, whereby the plunger transmits pressure to the gage and protects the same from heat, and a bleed valve for the chamber.

JOHN T. FITZPATRICK.

REFERENCES CITED

The following references are of record in the file of this patent:

UNITED STATES PATENTS

| Number | Name | Date |
| --- | --- | --- |
| 42,627 | Shaw | May 3, 1864 |
| 1,462,109 | Hopkins | July 17, 1923 |
| 1,828,093 | Ailman | Oct. 20, 1931 |
| 1,898,257 | Nelson | Feb. 21, 1933 |
| 2,122,243 | Bonhard | June 28, 1938 |
| 2,280,411 | Kiene | Apr. 21, 1942 |

FOREIGN PATENTS

| Number | Country | Date |
| --- | --- | --- |
| 6,069 | Great Britain | Mar. 12, 1898 |
| 117,593 | Switzerland | Apr. 1, 1927 |
| 567,067 | France | Nov. 30, 1923 |